Feb. 5, 1963
H. WEISSINGER
3,076,907
BRUSH HOLDER ASSEMBLY FOR ELECTRIC MACHINES
Filed Jan. 26, 1960
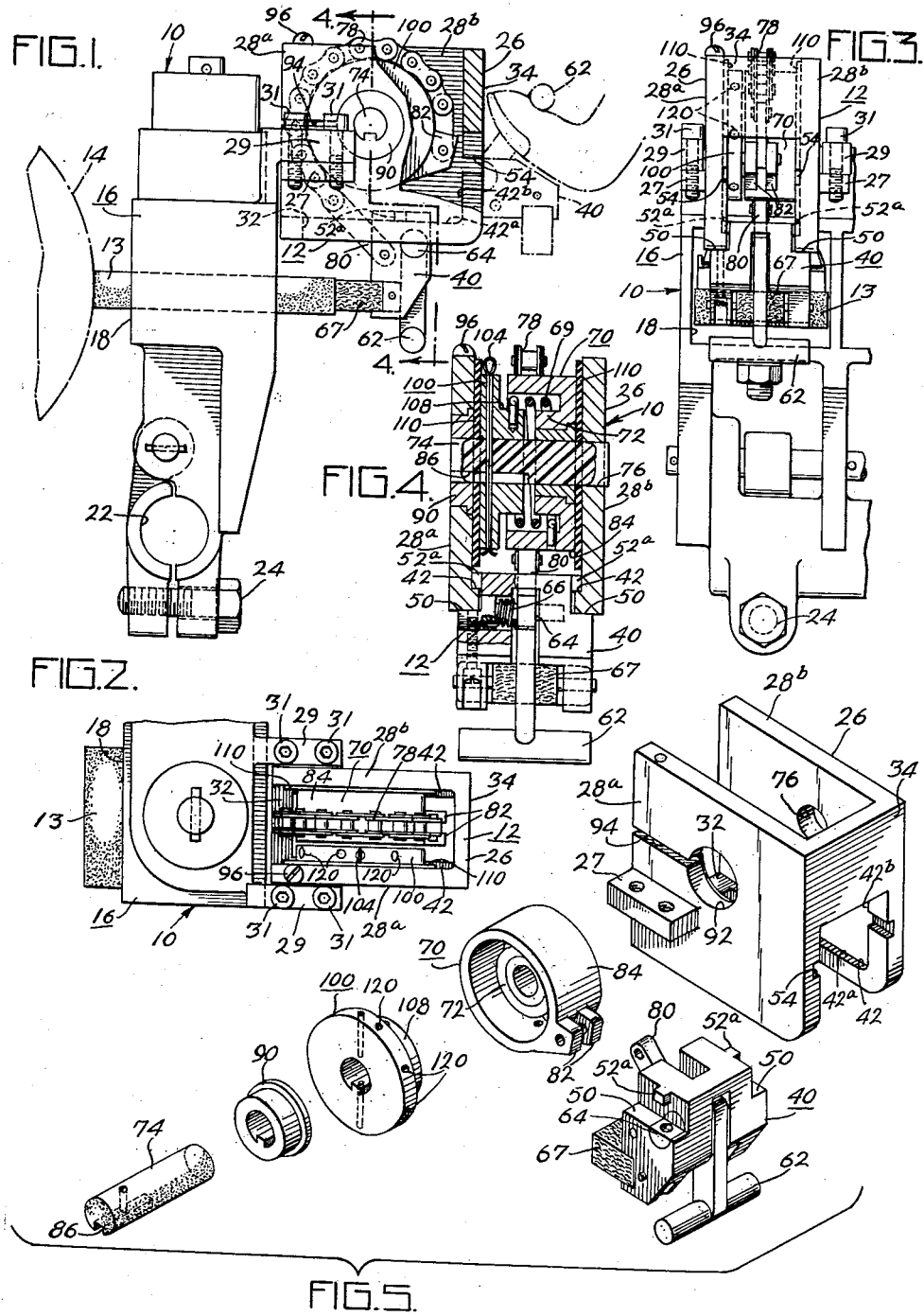
INVENTOR:
HARRY WEISSINGER
BY
Howson & Howson
ATTYS.

United States Patent Office 3,076,907
Patented Feb. 5, 1963

3,076,907
BRUSH HOLDER ASSEMBLY FOR
ELECTRIC MACHINES
Harry Weissinger, 1127 N. Dunton St., Philadelphia, Pa.
Filed Jan. 26, 1960, Ser. No. 4,672
6 Claims. (Cl. 310—246)

The present invention relates to new and useful improvements in brush holders for electrical machines and the like, and more particularly to an improved brush actuating mechanism for moving a brush or the like into engagement with a contact member of an electrical machine.

In electrical motors and generators, the brushes are mounted in a brush box for sliding movement therein, and means are provided to urge the brush into contact with the rotary contact member of the machine. Prior apparatus for actuating the brush have been characterized by several undesirable features. For example, in some installations the length of the brush was limited because of the actuating device. This resulted in increased cost of operation of the machine due to the frequent shut-downs to replace brushes, and the cost in removing and installing brushes.

With the foregoing in mind, an object of the present invention is to provide novel brush actuating mechanism for electric machines and the like which effectively eliminates the above difficulties of prior devices of this type and which permits the use of a considerably longer brush, thereby lowering the cost of operating an electrical machine by reducing the frequency for replacing brushes, and also the shut-down time.

Another object of the present invention is to provide a brush actuator for an electric machine which may be easily adjusted to provide the desired force for moving the brush into engagement with the contact member of the electric machine, and which may be quickly and easily positioned to permit removal and replacement of a worn-out brush.

A still further object of the present invention is to provide a novel brush actuator for electrical machines which is of relatively simplified construction, and is durable in use.

A further object is to provide an actuator wherein the moving force applied to the brush is in the direction of movement of the brush, and wherein the force applied is substantially uniform, thereby insuring the desired contact of brush and contact member.

These and other objects of the present invention and the various features and details of the operation and construction thereof are hereinafter more fully set forth with reference to the accompanying drawings, in which:

FIG. 1 is a side elevational view partially in section of a brush-holder and brush positioning apparatus made in accordance with the present invention;

FIG. 2 is a plan view of the apparatus shown in FIG 1;

FIG. 3 is an end elevational view taken from the top of FIG. 1;

FIG. 4 is an enlarged sectional view taken on line 4—4 of FIG. 1; and

FIG. 5 is a disc assembled perspective view of the elements of the brush positioning apparatus of the present invention.

Referring more specifically to the drawings, and more particularly to FIG. 1 thereof, reference numeral 10 designates generally a brush-holder for an electric machine comprising brush actuating mechanism 12 operable to engage and force a brush 13 into contact with the rotary contact member 14 of an electric machine or the like.

Positioned at the forward end of the brush-holder 10 is a brush box 16 having an open ended compartment 18 for receiving the brush 13 for longitudinal sliding movement therein. The brush-holder 10 may be formed of an electrically conductive material, and is provided with a recess 22 for receiving a supporting bar or the like. The bar serves as an electrical bus bar for taking power from or to the brush box. A clamping screw 24 is provided for making a solid connection between the housing and the supporting bar and to secure the brush box in the desired position.

In accordance with the present invention, brush actuating mechanism is provided for effecting movement of the brush longitudinally of the brush box into contact with the rotary contact 14 of the electric machine. The mechanism is mounted in a housing 26 defined by a pair of spaced parallel side walls 28a, 28b and a rear wall 34 which connects the side walls and extends downwardly from the top of the side walls for a portion of the height of the walls 28. Additionally, a bridge 32 connects the lower forward ends of the side walls. The housing 26 is mounted or secured to the brush box 10 adjacent the open-ended compartment 16, for example, by means of outwardly extending lugs 27 secured to the side walls which underlie spaced projecting members 29 on the brush box and are secured thereto by screws 31.

In the present instance a carriage 40 is mounted on the actuator housing 26 for movement into engagement with the brush 13 and biasing means are provided to actuate the carriage to effect longitudinal sliding movement of the brush into the compartment 16. To this end a track is provided in the housing 26 for slidably mounting the carriage 40 with the track being defined, for example, by inwardly extending flange members 42, 42 extending along the edge of the housing side walls as shown in FIG. 5. The track is divided into a longitudinal section 42a which is parallel to the sliding direction of the brush, and a transverse section 42b running transversely to the section 42a and formed as a continuation thereof, which terminates at the lower portion of the rear wall of the housing.

The carriage 40 is provided with a pair of runners 50 which engage the track and a pair of lugs 52 spaced from the runners adapted to engage over the flanges 42 and retain the carriage on the track. The carriage is removable from the housing through openings 54 provided in the track through which the lugs on the carriage may pass. A T-shaped lever 62 is pivotally mounted in the carriage on a pin 64 to provide a means for manually gripping the carriage, for example, to withdraw it from engagement with the brush. Biasing means are provided to normally maintain the position shown in FIG. 1. In the present instance the means comprises a coil spring 66 which circumscribes the lever pin 64 and is connected thereto at one of the coil terminal ends and connected to the carriage at the other end. An insulation insert 67 is mounted in the carriage which engages the brush to prevent flow of current to or from the brush through the carriage.

In accordance with the present invention, carriage actuating means is provided for actuating the carriage along the track into engagement with the brush to thereby move the brush into contact with the rotary contact member of the electrical machine. This means comprises a coil spring 69 fixed at one end to the housing and connected through a linkage system to the carriage. In the embodiment illustrated in the drawings, a barrel 70 is provided which is rotatably mounted at its hub portion 72 on a shaft 74 and normally urged in a clockwise direction with respect to FIG. 1 by the coil spring 69. The shaft is journalled at one end in an opening 76 in the side wall 28b of the housing. The carriage is connected to the barrel 70 by means of a flexible linkage or chain 78 pivotally mounted at one end to link 80 carried by the carriage, and pivotally fastened at the other end to a lug 82 on the outer wall 84 of the barrel. The shaft 74 has a keyway 86 extending longitudinally thereof from one end to approximately the midpoint thereof. The keyway end of the shaft mounts a bushing 90 having a key which co-acts with the keyway to prevent rotary movement of the bushing with respect to the shaft. The bushing is rotatably mounted in an opening 92 in the side wall 28a of the housing. A slotted opening 94 is provided in the housing from the front wall to the opening 92. A screw 96 extending through side wall 28a extends across the slotted opening and is threadedly received in a threaded opening in the side wall 28a. The screw 96 serves as a clamping member, so that when it is threaded inwardly, it effects a narrowing of the slotted opening 94 which in turn restricts the opening 92 which in turn frictionally grips the bushing 90 and precludes rotation of the bushing and the shaft with respect to the opening 90. A tensioning disc 100 is mounted on the shaft intermediate the bushing and the open end of the barrel. The disc is keyed to the shaft and is prevented from axial movement thereof in the assembled position by a cotter pin 104 which passes through registering radially extending openings in the disc and shaft. The coil spring 69 is connected at one end to a hub 108 on the disc, and at its other end to the inner surface of the wall 84 of the barrel and has convolutions wound in a direction to normally urge the barrel, with reference to FIG. 1, in a clockwise direction.

The brush actuating mechanism is properly insulated so that current is precluded from flowing to or from the brush actuating mechanism by providing a pair of fiber washers 110 positioned about the shaft 74 which is of a non-conductive material, between the housing and the actuating mechanism as shown in FIG. 4. If it is desired, insulating washers 110 may be provided between the housing and the carriage actuating means and the shaft 74 may be made of a non-conductive material to prevent flow of current to or from the actuating mechanism.

In operation of the brush actuating mechanism, when the parts are in the assembled position shown in FIG. 1 the carriage is motivated along the track by applying a force on the brush to urge the brush into contact with the rotary member 14 of the electric machine. This force is supplied by the coil spring 69 which tends to rotate the barrel 70 on the shaft 74 in a clockwise direction, which in turn, through the flexible link 78 tends to move the carriage to the left. In this position the shaft 74 is prevented from rotation within the housing by clamping screw 96 which prevents rotation of the bushing in the opening 97. When it is desired to increase the force applied by the carriage, the torque on the coil spring 69 is increased. This is done by screwing the clamping screw 96 outwardly, which releases the frictional grip on the bushing 90 and permits the shaft 74 and the tensioning disc 100 keyed to the shaft to be rotated. The tensioning disc is rotated by means of a key which fits into openings 120 in the outer periphery of the disc in a direction to increase torque on the spring, which, in the present instance, is the counter-clockwise direction. When the desired adjustment has been made, the disc and shaft are secured in this position by actuating the clamping screw 96.

When it becomes necessary to replace a worn-out brush, the carriage may be pulled to the right as shown in FIG. 1, and moved to the transverse track 42b to the position shown in dotted lines. The carriage may be released, and it will remain in this position until the brush has been replaced.

Accordingly, it is apparent that the present invention provides a novel brush actuating mechanism for electric machines and the like which is effective in operation and may be constructed easily and economically. The mechanism of the present invention permits the use of larger brushes than in prior devices which holds the overall cost of operating an electric machine by reducing the frequency for replacing brushes and also the cost involved in frequent replacement of brushes.

While a particular embodiment of the present invention has been herein illustrated and described, it is not intended to limit the invention to such disclosure, but changes and modifications may be made therein and thereto within the scope of the following claims.

I claim:

1. A brush holder for electric machines comprising an open-ended brush box for receiving a brush therein for sliding movement in a predetermined path, a brush actuator housing mounted adjacent said brush box having spaced side walls, a track formed by inwardly-extending flanges on the housing side walls defining a first track portion parallel to the path of movement of the brush and a second track portion extending angularly to said first track portion in a direction away from the path of movement of the brush, a carriage mounted on said track for movement thereof, brush actuating means in said housing interconnected with said carriage operable to normally urge said carriage along said first portion of the track in pressure-applying relation against the brush, said carriage being retractable against said brush actuating means to a position on said second portion of the track out of engagement with the brush and removed from the path of sliding movement thereof to permit withdrawal of the brush from the brush box.

2. Apparatus in accordance with claim 1, wherein the brush actuating means comprises a barrel rotatably mounted in the housing, means connecting the barrel and the carriage, and biasing means normally urging the barrel in one direction to urge said carriage in pressure-applying relation against the brush.

3. Apparatus in accordance with claim 2 including a shaft mounted in the side walls of the housing, said barrel being rotatably mounted on said shaft, a disc fixed to said shaft for rotation therewith, a coil spring connected at one end to said disc and at the other end to said barrel, said spring operable to cause rotation of the barrel in a direction to effect actuation of the carriage toward the brush, and means for selectively varying the torque on said spring to thereby control the pressure exerted by said carriage on said brush.

4. A brush-holder for electric machines comprising an open-ended brush box for receiving a brush for longitudinal sliding movement therein, a brush actuator housing mounted adjacent said brush box having spaced parallel generally rectangular side walls, a track formed by inwardly extending flanges on the periphery of the side walls, said track having a first portion along an edge of the side walls parallel to the sliding direction of the brush and a second portion along an edge transverse to said first portion, a carriage mounted on the track for movement longitudinally thereof, at least one shoulder on said carriage operable to engage over said track, means on said carriage spaced from said shoulder to engage under said track to maintain said carriage in position on said track, brush actuating means in said housing interconnected with said carriage operable to normally urge said carriage along said first portion of track into engagement with said brush, and a gripping member on said carriage to provide means for moving the carriage from said first portion of the track to said second portion of the track against the urging of said biasing means out of engagement with the brush.

5. Apparatus in accordance with claim 4, including means defining aligned openings in said second portion of said track to permit insertion and removal of said carriage from the housing.

6. A brush holder for electric machines comprising an open-ended brush box, a brush, said brush received within said brush box for sliding movement in a predetermined path, a brush actuator housing mounted adjacent said brush box, means defining a track in said housing having a first portion parallel to the path of sliding movement of the brush and a second portion extending angularly to said first track portion in a direction away from the path of movement of the brush, a carriage mounted in said housing for movement along said track, means for actuating said carriage along said first portion of the track in one direction of movement of said brush including a barrel rotatably mounted in said housing, means connecting the barrel and carriage, biasing means normally urging the barrel in one direction to urge said carriage in pressure-applying relation against the brush, said carriage being retractable against said bias means to a position on said second portion of the track out of engagement with the brush and removed from the path of sliding movement thereof to permit withdrawal of the brush from the brush box.

References Cited in the file of this patent
UNITED STATES PATENTS

| | | |
|---|---|---|
| 489,185 | Goodrich | Jan. 3, 1893 |
| 510,892 | Coffman | Dec. 10, 1893 |
| 610,620 | Bassford | Sept. 13, 1898 |
| 740,635 | Eck | Oct. 6, 1903 |
| 2,972,689 | Kuhn | Feb. 21, 1961 |